(12) United States Patent
Kitakami et al.

(10) Patent No.: US 11,425,361 B2
(45) Date of Patent: Aug. 23, 2022

(54) IMAGE DISPLAY DEVICE

(71) Applicant: CANON KABUSHIKI KAISHA, Tokyo (JP)

(72) Inventors: Marina Kitakami, Tokyo (JP); Toshiharu Kawai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/157,811

(22) Filed: Jan. 25, 2021

(65) Prior Publication Data

US 2021/0243428 A1    Aug. 5, 2021

(30) Foreign Application Priority Data

Jan. 31, 2020    (JP) ............................. JP2020-015293

(51) Int. Cl.
*H04N 13/344*    (2018.01)
*H04N 13/204*    (2018.01)

(52) U.S. Cl.
CPC ......... *H04N 13/344* (2018.05); *H04N 13/204* (2018.05)

(58) Field of Classification Search
CPC ........................... H04N 13/344; H04N 13/204
USPC ......................................................... 348/46
See application file for complete search history.

(56) References Cited

U.S. PATENT DOCUMENTS

| | | | |
|---|---|---|---|
| 2010/0177168 A1* | 7/2010 | Hu | H04N 13/344 348/47 |
| 2014/0002496 A1* | 1/2014 | Lamb | G06T 19/006 345/633 |
| 2015/0219900 A1* | 8/2015 | Rhodes | G02B 27/0176 345/8 |
| 2015/0370072 A1* | 12/2015 | Lee | G06T 19/006 345/8 |
| 2020/0168181 A1* | 5/2020 | Lin | G02B 26/108 |
| 2020/0169680 A1* | 5/2020 | Park | H04N 5/36963 |

FOREIGN PATENT DOCUMENTS

JP            4609256 B2    1/2011

* cited by examiner

*Primary Examiner* — Amir Shahnami
(74) *Attorney, Agent, or Firm* — Canon U.S.A., Inc. IP Division

(57) ABSTRACT

An image display device includes a display optical system, a base including a display optical system guide unit configured to guide the display optical system in a substantially linear direction, a main body exterior configured to house the base, a display exterior configured to cover the display optical system, and a display exterior guide unit configured to guide the display exterior in a substantially linear direction relative to the main body exterior, wherein the display optical system is engaged with the display exterior to move in conjunction with the display exterior, and wherein the base and the main body exterior are engaged with each other by an engagement mechanism configured to suppress transmission of an external force applied to the main body exterior to the base.

7 Claims, 10 Drawing Sheets

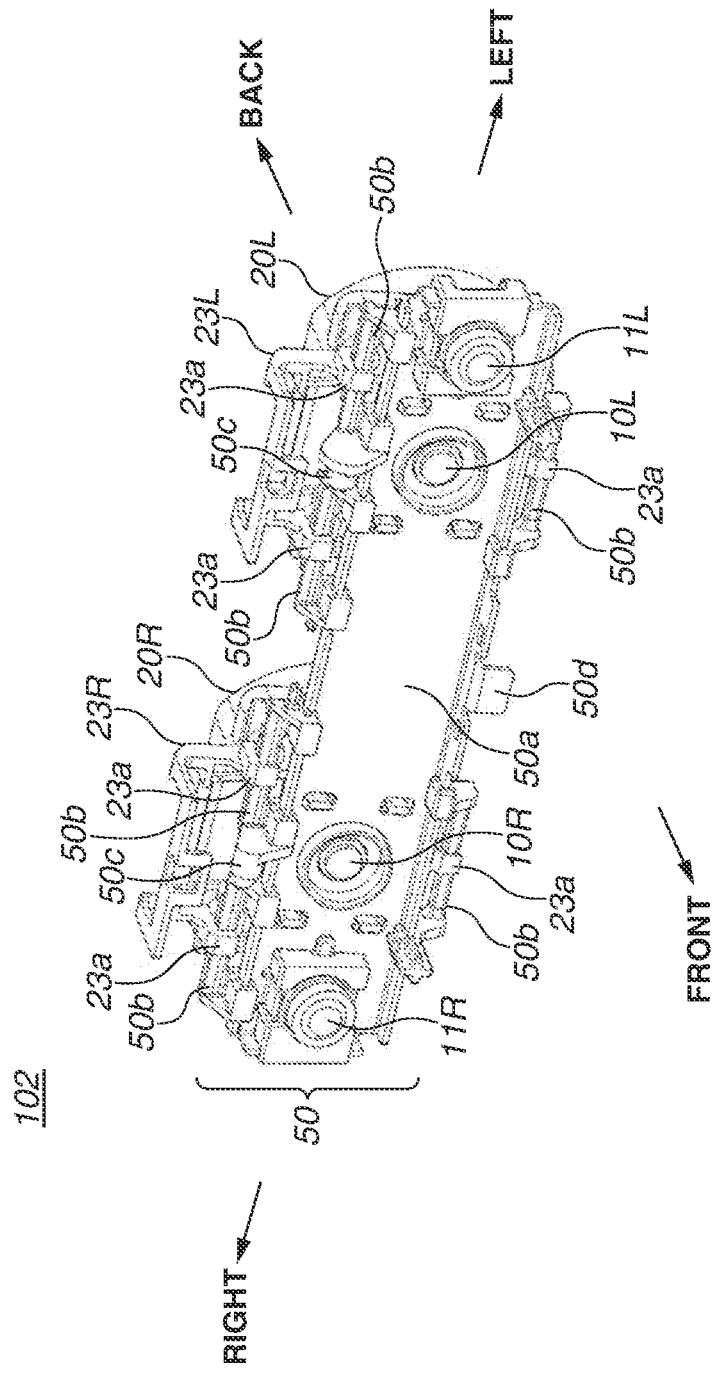

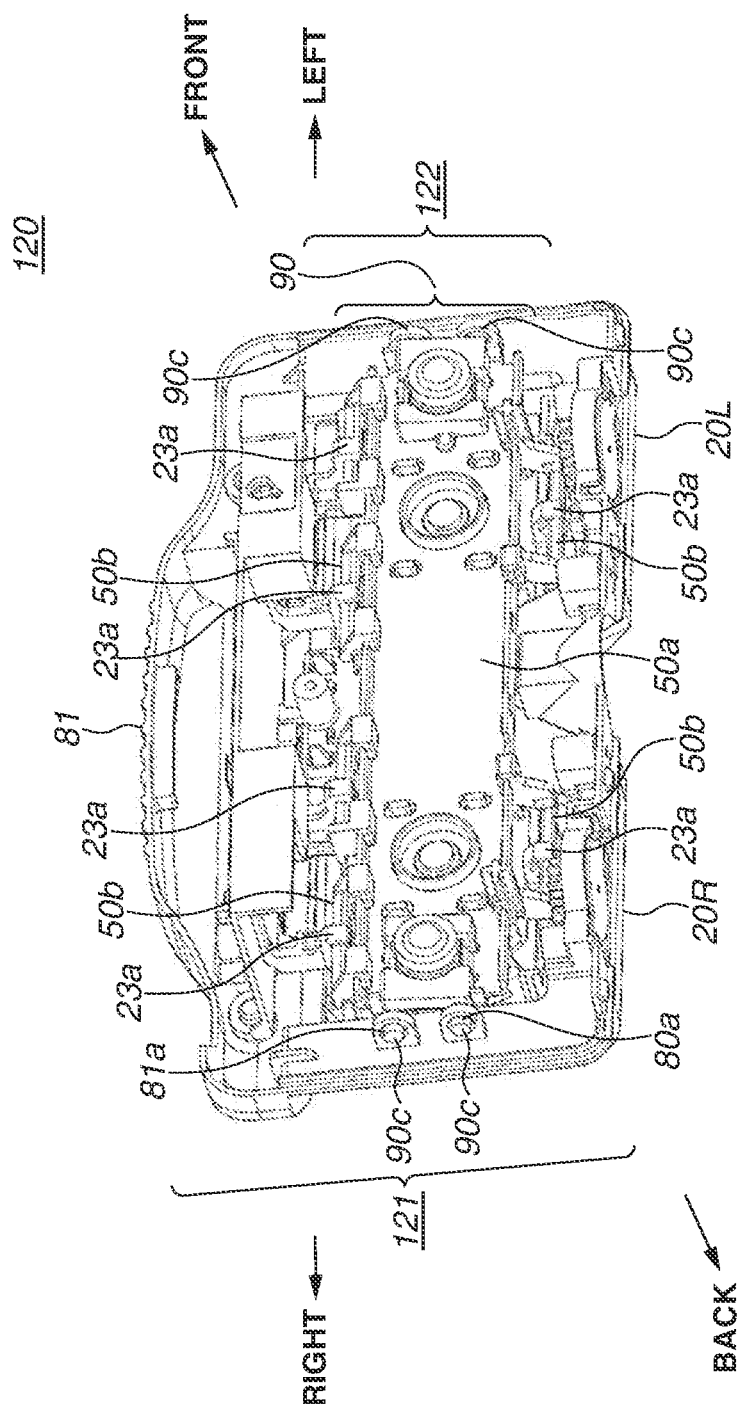

IMAGE DISPLAY DEVICE

BACKGROUND

Field of the Disclosure

The present disclosure relates to an image display device.

Description of the Related Art

In recent years, a head mounted display (HMD) worn on the head of a user and displaying an image in front of the eyes of the user has been used as an image display device. The HMD is used as a device that enables a user to experience virtual reality (VR) and mixed reality (MR), for reasons such as enabling a user to readily view an image as if the image is displayed in a large screen and easy viewing of a stereoscopic image.

The HMD for implementing MR includes an image capturing unit for capturing an object image corresponding to each of the right and left eyes of a user, a display unit for displaying an image generated by superimposing an image captured by the image capturing unit and a three-dimensional computer graphic (3DCG) image generated by an apparatus such as a personal computer (PC), and a display optical system for projecting an image onto the user. The image is projected onto the user as follows. First, the image is displayed on a display element such as a small liquid crystal panel corresponding to each of the right and left eyes of the user, the image is then enlarged via the display optical system corresponding to each of the right and left eyes of the user, and the enlarged image is projected onto each of the right and left eyeballs of the user.

The captured image is an image having parallax corresponding to both of the right and left eyes. Further, a virtual 3DCG image can be expressed as if this image actually exists, by generating a 3DCG image using a parallax image corresponding to both of the right and left eyes of the user and displaying the generated 3DCG image superimposed on an image captured by an image capturing system. The HMD has a function of adjusting a position of the display optical system to a distance between both eyes of the user.

Japanese Patent No. 4609256 discusses an HMD including a pupil distance adjustment mechanism for adjusting a distance between a display unit for the left eye and a display unit for the right eye. In the HMD of Japanese Patent No. 4609256, however, the display unit is attached to a main body frame via a rail, so that there is concern that, in a case where an external force that causes deformation such as twisting is applied to the main body by a user, the rail plastically deforms, thereby reducing optical accuracy.

SUMMARY

The present disclosure is directed to improvement of optical accuracy.

According to an aspect of the present disclosure, an image display device includes a display optical system, a base including a display optical system guide unit configured to guide the display optical system in a substantially linear direction, a main body exterior configured to house the base, a display exterior configured to cover the display optical system, and a display exterior guide unit configured to guide the display exterior in a substantially linear direction relative to the main body exterior, wherein the display optical system is engaged with the display exterior to move in conjunction with the display exterior, and wherein the base and the main body exterior are engaged with each other by an engagement mechanism configured to suppress transmission of an external force applied to the main body exterior to the base.

Further features of the present disclosure will become apparent from the following description of exemplary embodiments with reference to the attached drawings.

BRIEF DESCRIPTION OF THE DRAWINGS

FIG. 6 is a diagram illustrating a configuration of an optical unit.

FIG. 10 is a diagram illustrating an engagement mechanism between an exterior unit and an optical unit according to one or more aspects of the present disclosure.

DESCRIPTION OF THE EMBODIMENTS

An image display device according to each of exemplary embodiments of the present disclosure will be described below with reference to the drawings. In each of the drawings, a front side, a back side, a right side, and a left side are indicated as front, back, right, and left as appropriate.

Figure 1:
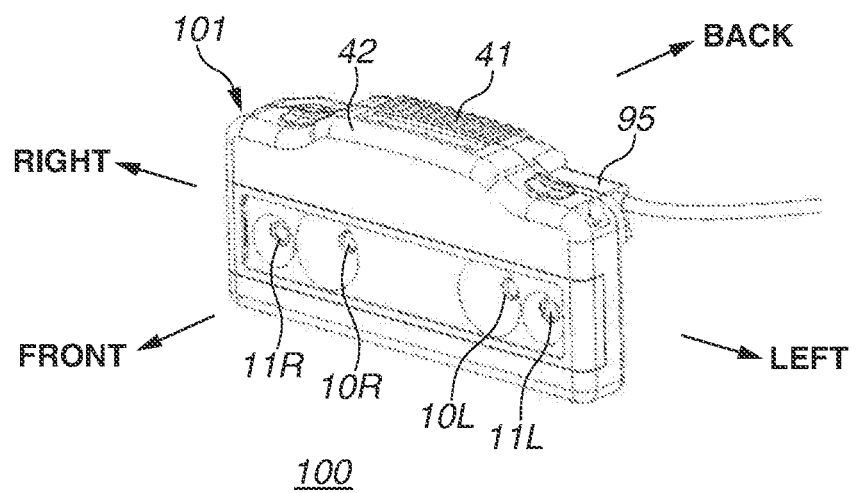
FIG. 1 is a diagram illustrating an image display device according to one or more aspects of the present disclosure.
Figure 2:
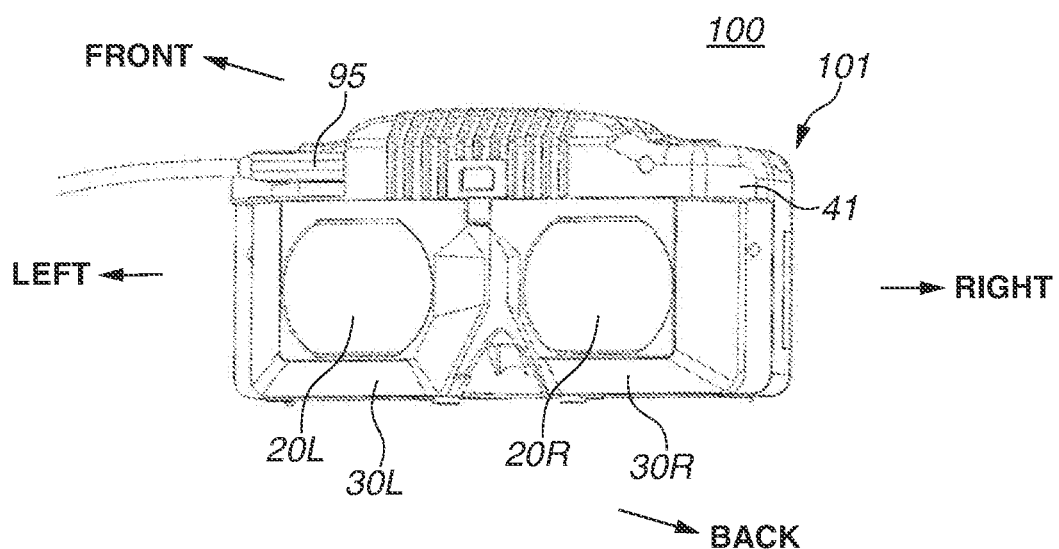
FIG. 2 is a diagram illustrating the image display device as viewed from the back.

FIG. 1 is a diagram illustrating an image display device 100 according to a first exemplary embodiment as viewed from the front. FIG. 2 is a diagram illustrating the image display device 100 as viewed from the back.

The image display device 100 includes image capturing cameras 10L and 10R and positioning cameras 11L and 11R. The image capturing cameras 10L and 10R form a stereo camera for acquiring a real image of a surrounding area to be displayed to a user via lenses 20L and 20R. The image capturing cameras 10L and 10R correspond to an example of an image capturing unit. The positioning cameras 11L and 11R form a stereo camera for acquiring position information and orientation information of the image display device 100 using feature points such as a marker and an edge of an object from the acquired image. The positioning cameras 11L and 11R correspond to an example of an acquisition unit.

In the image display device 100, the image capturing cameras 10L and 10R and the positioning cameras 11L and 11R are disposed separately, and the positioning cameras 11L and 11R perform positioning with high accuracy and high fault tolerance, using, for example, a high angle of view in monochrome, a high shutter speed, and a long base-line length. The image display device 100 can acquire both of the image to be displayed and the positioning information, using only the image capturing cameras 10L and 10R. In the image display device 100, the positioning cameras 11L and 11R can be replaced with a device such as a range sensor using ultrasound or infrared radiation.

The image display device 100 generates an image by performing processing such as superimposing a computer graphic (CG) on a real image by transmitting and receiving position information and an image to and from an external personal computer (PC) or a controller via a cable 95, and displays the generated image on an image display unit such as a liquid crystal display (LCD) or an organic electroluminescent display (OLED) in the image display device 100. The user can observe an image through the lenses 20L and 20R from the back. The lenses 20L and 20R are components such as a prism and a lens for enlarging an image displayed on the image display unit and guiding light. The lenses 20L and 20R correspond to an example of a display optical system. The image display device 100 includes lens hoods 30L and 30R around the lenses 20L and 20R, respectively. The lens hoods 30L and 30R correspond to an example of a display exterior.

Figure 3A:
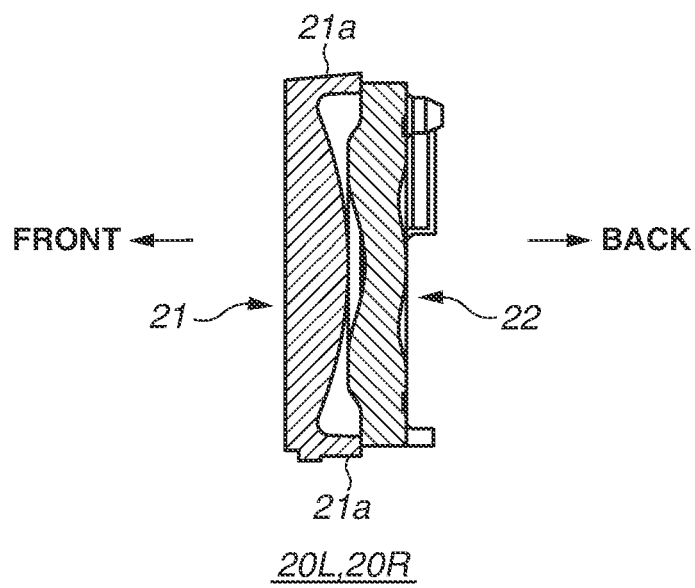
FIGS. 3A and 3B are diagrams each illustrating a configuration of a lens.
Figure 3B:
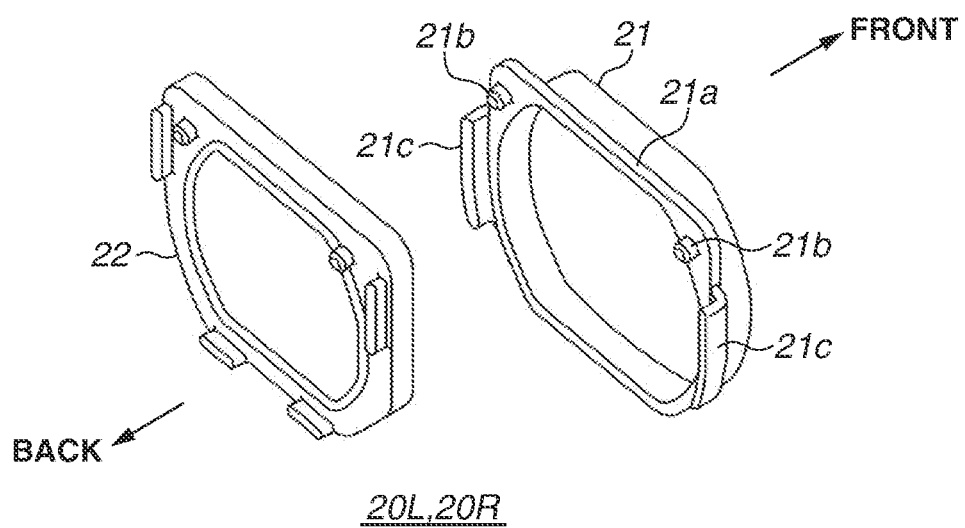

FIGS. 3A and 3B are diagrams illustrating a configuration of each of the lenses 20L and 20R. FIG. 3A is a cross-sectional view of each of the lenses 20L and 20R, and FIG. 3B is an exploded perspective view of each of the lenses 20L and 20R.

The lenses 20L and 20R are each configured by combining two lenses, and do not have a lens barrel. The lenses 20L and 20R are each configured by adhering a G1 lens 21 and a G2 lens 22 to each other. The G1 lens 21 includes a cylindrical rib 21a outside an optical range. In the rib 21a, a flat portion substantially orthogonal to an optical axis is formed at a rear end. In the G2 lens 22, a flat portion substantially orthogonal to the optical axis is formed at a front end outside an optical range. A distance between a surface of the G1 lens 21 and a surface of the G2 lens 22 is determined by bringing the flat portion of the rib 21a of the G1 lens 21 and the flat portion of the G2 lens 22 into surface contact with each other. In addition, the inside of each of the lenses 20L and 20R can be protected from dust by bringing the G1 lens 21 and the G2 lens 22 into surface contact with each other. As illustrated in FIG. 3B, positioning portions 21b and 21c disposed outside the optical range of the G1 lens 21 determine an optical-axis deviation shift amount between the G1 lens 21 and the G2 lens 22. Because this configuration of the lenses 20L and 20R does not use a lens barrel, the number of components can be reduced, so that the cost as well as the size and weight can be reduced.

Figure 4A:
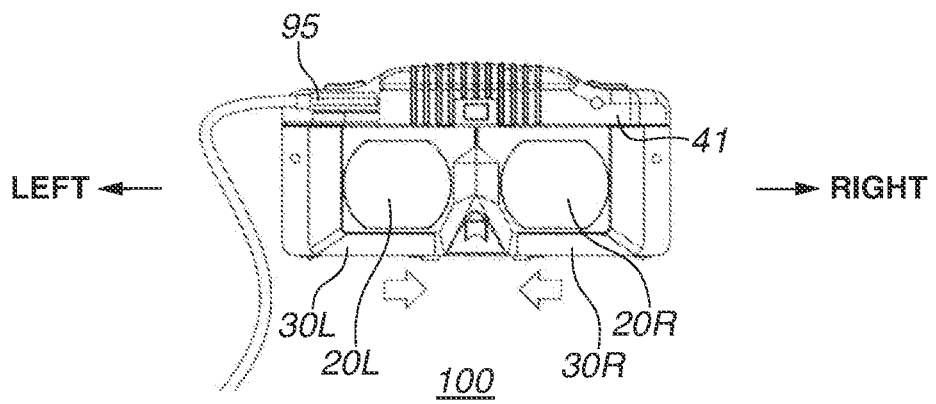
FIGS. 4A and 4B are diagrams each illustrating a case where a distance between the lenses of the image display device is adjusted.
Figure 4B:
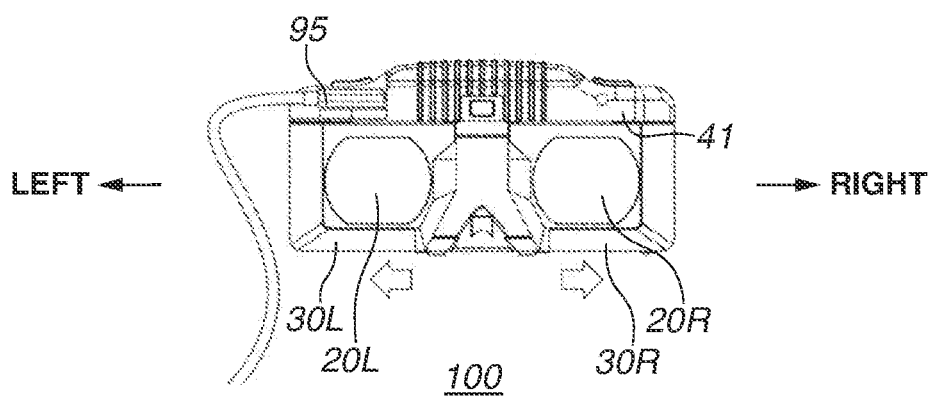

FIGS. 4A and 4B are diagrams each illustrating the image display device 100 as viewed from the back, and illustrate a case where a distance between the lens 20L and the lens 20R is adjusted to a pupil distance of the user. The lenses 20L and 20R and the lens hoods 30L and 30R are engaged with each other to be movable in conjunction with each other. The lens hoods 30L and 30R of the present exemplary embodiment are engaged with the lenses 20L and 20R only in a right-left direction (a moving direction), and can move in other directions within a predetermined distance range.

As illustrated in FIG. 4A, the user can adjust the distance between the lens 20L and the lens 20R to the pupil distance of the user by operating the lens hoods 30L and 30R. In the present exemplary embodiment, the lens hoods 30L and 30R and a rear cover 41 to be described below are separate components, but it is conceivable that the lens hoods 30L and 30R and the rear cover 41 can be integrated to reduce the number of the components so that the lenses 20L and 20R may be exposed. In this case, however, it is necessary to cover an entire movable range in the pupil distance direction of the lenses 20L and 20R with the rear cover 41, thereby increasing a size of the entire image display device 100. The size of the entire image display device 100 can be reduced by providing the lens hoods 30L and 30R and the rear cover 41 as separate components, and interlinking the lenses 20L and 20R and the lens hoods 30L and 30R, as in the present exemplary embodiment.

Figure 5A:
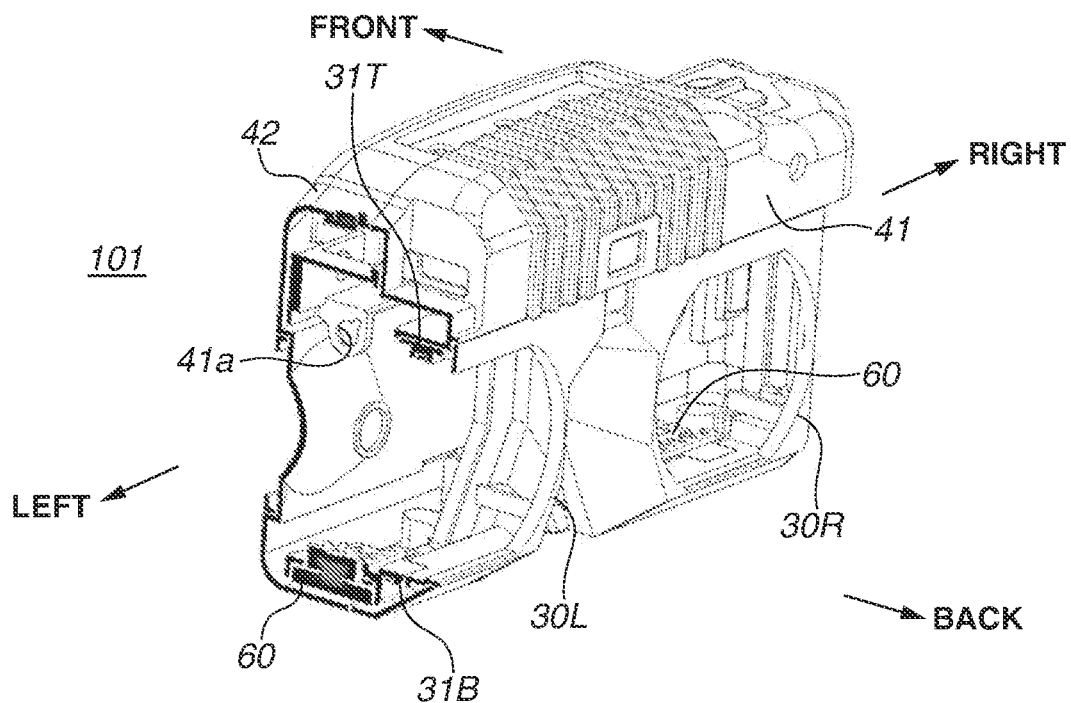
FIGS. 5A and 5B are a cut-away view of an exterior unit and a side view of a part of the exterior unit, respectively.

A configuration of an exterior unit 101 of the image display device 100 will be described. FIG. 5A is a cut-away view of the exterior unit 101.

The exterior unit 101 includes the rear cover 41, a front cover 42, and the lens hoods 30L and 30R. The rear cover 41 and the front cover 42 house an optical base 50 to be described below. The rear cover 41 and the front cover 42 do not cover the lenses 20L and 20R. The rear cover 41 and the front cover 42 correspond to an example of a main body exterior.

The rear cover 41 includes two shaft holes 41a formed in a support plate having portions away from each other to hang down at the right and left in an inner space thereof (see also FIG. 7 to be described below). The two shaft holes 41a are coaxially arranged in the right-left direction. The shaft holes 41a function as a part of an engagement mechanism for engagement between an optical unit 102 to be described below and the exterior unit 101.

The rear cover 41 further includes rail members 31T and 31B at an upper part and a lower part of a space where the lens hoods 30L and 30R are disposed. The rail members 31T and 31B correspond to an example of a display exterior guide unit. The rail members 31T and 31B guide the lens hoods 30L and 30R so that the lens hoods 30L and 30R can move in a substantially linear direction along the right-left direction relative to the rear cover 41.

Figure 5B:
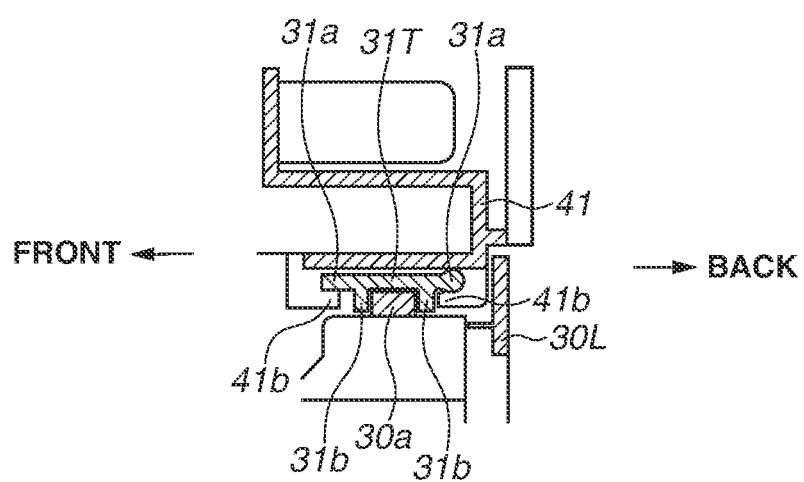

FIG. 5B is a diagram illustrating a configuration around the rail member 31T illustrated in FIG. 5A as viewed from the left. The rail member 31T includes first protrusions 31a each having a portion protruding frontward and a portion protruding backward, and a pair of second protrusions 31b both protruding downward. The rear cover 41 has grooves 41b that guide the first protrusions 31a so that the first protrusions 31a can slide along the right-left direction. Therefore, the rail member 31T slides in the right-left direction along the grooves 41b relative to the rear cover 41. Similarly, the rail member 31B slides in the right-left direction relative to the rear cover 41.

The lens hoods 30L and 30R are engaged with the rail members 31T and 31B in the right-left direction to move in the right-left direction integrally with the rail members 31T and 31B. Further, the lens hoods 30L and 30R include a regulating portion 30a between the pair of second protrusions 31b of the rail member 31T. The regulating portion 30a of the present exemplary embodiment is disposed with no space between the pair of second protrusions 31b, so that movements in a front-back direction and an up-down direction are regulated. Therefore, the lens hoods 30L and 30R are engaged with the rail members 31T and 31B in the right-left direction, the front-back direction, and the up-down direction. The lens hoods 30L and 30R and the rail members 31T and 31B are thus engaged with each other, so that the lens hoods 30L and 30R can move in a substantially linear direction along the right-left direction relative to the rear cover 41 via the rail members 31T and 31B. The lens hoods 30L and 30R cover a peripheral edge of the lens 20L and a peripheral edge of the lens 20R, respectively, which are not covered by the rear cover 41 and the front cover 42.

The rail members 31T and 31B and the lens hoods 30L and 30R are provided as separate components without being integrated as described in the present exemplary embodiment, so that different materials can be used. For example, polyacetal resin (polyoxymethylene (POM)) with high slidability and heavy specific gravity can be used for the rail members 31T and 31B, while modified polyphenylene ether (m-PPE) with light specific gravity can be used for the lens hoods 30L and 30R. In addition, because the lens hoods 30L and 30R are positioned with respect to the rear cover 41 via the rail members 31T and 31B in the directions except for the right-left direction, a gap between the lens hoods 30L and 30R and the rear cover 41 can be minimized, so that appearance quality can be improved.

The rear cover 41 includes a stopper (not illustrated). In a case where the lens hoods 30L and 30R are moved to the maximum or minimum in the right-left direction, the stopper brings at least one of the lens hoods 30L and 30R and the rail members 31T and 31B into contact with the rear cover 41, thereby limiting the movement of the lens hoods 30L and 30R. Here, the maximum corresponds to a case where the lens hood 30L and the lens hood 30R are each moved in a direction to be farthest away from each other, and the minimum corresponds to a case where the lens hood 30L and the lens hood 30R are each moved in a direction to be closest to each other. The stopper corresponds to an example of a limiting mechanism. The present exemplary embodiment is not limited to the case where the rear cover 41 includes the stopper, and the front cover 42 can include the stopper or the lens hoods 30L and 30R can include the stopper.

The rear cover 41 includes a rotary damper 60. The rotary damper 60 can hold the lens hoods 30L and 30R at any position relative to the tear cover 41 via the rail member 31B, by meshing with the rail member 31B using a rack and pinion. The rotary damper 60 corresponds to an example of a holding mechanism. The present exemplary embodiment is not limited to the case where the rear cover 41 includes the rotary damper 60, and the front cover 42 can include the rotary damper 60. The rotary damper 60 can be replaced with a device such as a damper hinge.

A configuration of the optical unit 102 of the image display device 100 will be described. FIG. 6 is a diagram illustrating the configuration of the optical unit 102.

The optical unit 102 includes the optical base 50, the image capturing cameras 10L and 10R, the positioning cameras 11L and 11R, the lenses 20L and 20R, and lens holders 23L and 23R.

The optical base 50 includes a base portion 50a, a rail portion 50b, a shaft portion 50c, and a rotation stop portion 50d. The optical base 50 corresponds to an example of a base.

The base portion 50a is substantially shaped like a plate long in the right-left direction and has a surface orthogonal to the front-back direction. The base portion 50a supports the image capturing cameras 10L and 10R and the positioning cameras 11L and 11R. The six rail portions 50b in total are provided, four at an upper end and two at a lower end of the base portion 50a. The rail portions 50b guide the lenses 20L and 20R so that the lenses 20L and 20R can move in a substantially linear direction along the right-left direction. The three rail portions 50b on the left guide the lens 20L, and the three rail portions 50b on the right guide the lens 20R. The rail portion 50b corresponds to an example of a display optical system guide unit. The lens holders 23L and 23R are respectively adhered to the lenses 20L and 20R. The lens holders 23L and 23R each include a slide portion 23a that slides along each of the rail portions 50b. Because the lens holders 23L and 23R are positioned by the rail portions 50b and the slide portions 23a in the directions except for the right-left direction, the lenses 20L and 20R can move along the right-left direction.

The two shaft portions 50c are disposed at an upper end of the base portion 50a while being away from each other at the right and left. The two shaft portions 50c are coaxially arranged along the right-left direction, and are each disposed between the adjacent rail portions 50b. The shaft portions 50c function as a part of an engagement mechanism for engagement between the exterior unit 101 and the optical unit 102. The shaft portions 50c of the present exemplary embodiment are molded integrally with the rail portions 50b.

The rotation stop portion 50d is disposed at a lower end in substantially the center of the base portion 50a in the right-left direction. The rotation stop portion 50d stops the optical unit 102 from rotating around the shaft portion 50c and the shaft hole 41a when the optical unit 102 and the exterior unit 101 are engaged with each other. The rotation stop portion 50d of the present exemplary embodiment is substantially shaped like a plate, and is molded integrally with the base portion 50a.

The optical base 50 of the present exemplary embodiment is obtained by insert molding using POM with high slidability for the rail portion 50b and an aluminum alloy with high rigidity for the base portion 50a. Therefore, the optical base 50 can have both of accuracy by resin molding and rigidity of metal sheet. Misalignment between image capturing and display can be suppressed by attaching the image capturing cameras 10L and 10R and the positioning cameras 11L and 11R to the optical base 50. Moreover, the base portion 50a is a metal plate and thus has thermal conductivity higher than that of a resin material. Accordingly, even in a case where the temperature of the optical base 50 rises because of heat produced by devices such as the image capturing cameras 10L and 10R, the positioning cameras 11L and 11R, and the image display unit in use, the heat is radiated, so that heat deformation of the optical base 50 can be suppressed. It is therefore possible to suppress an alignment thermal shift of the image capturing cameras 10L and 10R, the positioning cameras 11L and 11R, and the image display unit.

The engagement mechanism between the exterior unit 101 and the optical unit 102 will be described.

Figure 7:
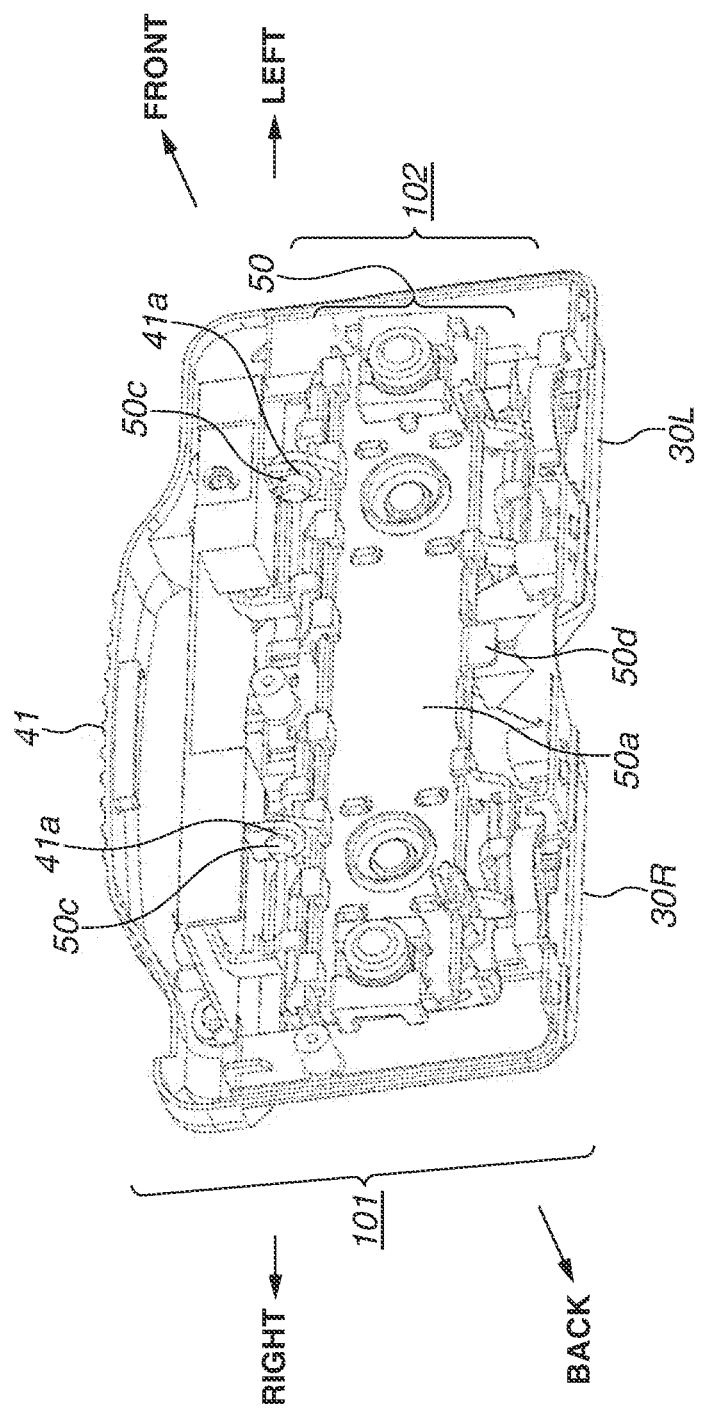
FIG. 7 is a diagram illustrating an engagement mechanism between the exterior unit and the optical unit.

FIG. 7 is a diagram illustrating the engagement mechanism between the exterior unit 101 and the optical unit 102.

The two shall portions 50c of the optical base 50 are inserted into the respective two shaft holes 41a of the rear cover 41 in a loose-fit state, so that the optical unit 102 and the exterior unit 101 are engaged with each other. Because the shaft portions 50c and the shaft holes 41a are respectively in the loose-fit state, the optical base 50 is supported in a floating state of hanging from the rear cover 41 via the shaft portions 50c and the shaft holes 41a. The rotation of the optical base 50 around the shaft portion 50c and the shaft hole 41a is stopped by abutment of the rotation stop portion 50d on the rear cover 41 and the front cover 42.

Even if the user applies an external force that causes deformation such as twisting while holding the exterior unit 101, the transmission of the applied force to the optical base 50 can be suppressed by the above-described engagement mechanism between the exterior unit 101 and the optical unit 102. Suppressing the transmission of the force to the optical base 50 can reduce an influence on the lenses 20L and 20R, the image capturing cameras 10L and 10R, and the positioning cameras 11L and 11R attached to the optical base 50, so that the optical accuracy of the optical unit 102 can be improved.

The optical base 50 and the exterior unit 101 are engaged with each other by the insertion of the shall portions 50c into the shaft holes 41a in the loose-fit state. Therefore, in a case where the user applies an external force that causes deformation such as twisting the exterior unit 101, the shaft portion 50c is rotated around the axis of the shaft hole 41a, so that the transmission of the force to the optical base 50 can be suppressed.

The rotation of the optical base 50 is stopped by the rotation stop portion 50d. Therefore, the accuracy of the optical position of the image display device 100 can be improved even if there is no load.

The image display device 100 includes the rotary damper 60 that holds the lens hoods 30L and 30R at any position relative to the rear cover 41 and the front cover 42. Therefore, the position can be maintained after the lens hoods 30L and 30R are moved by the user to match the pupil distance.

One of the rear cover 41 and the front cover 42 includes the stopper that limits the movement of the lens hoods 30L and 30R in a case where the lens hoods 30L and 30R are moved. Therefore, even if the user applies a force exceeding that in normal use in the right-left direction, which causes the deformation, the force is received by the stopper not to be transmitted to the lenses 20L and 20R. Accordingly, the optical accuracy can be maintained.

The image display device 100 includes the image capturing cameras 10L and 10R for acquiring an image of a surrounding area and the positioning cameras 11L and 11R for acquiring position information, and is therefore expected to also have the optical accuracy of the image capturing cameras 10L and 10R and the positioning cameras 11L and 11R. In the present exemplary embodiment, the optical base 50 includes the image capturing cameras 10L and 10R and the positioning cameras 11L and 11R, so that the optical accuracy of the image capturing cameras 10L and 10R and the positioning cameras 11L and 11R can be maintained. The image display device 100 is described to include the image capturing cameras 10L and 10R and the positioning cameras 11L and 11R, but is not limited to this case and can include at least one of the image capturing cameras 10L and 10R and the positioning cameras 11L and 11R.

An image display device 110 according to a second exemplary embodiment will be described. Configurations similar to those of the first exemplary embodiment are provided with the same reference numerals as those thereof and thus will not be described.

Figure 8:
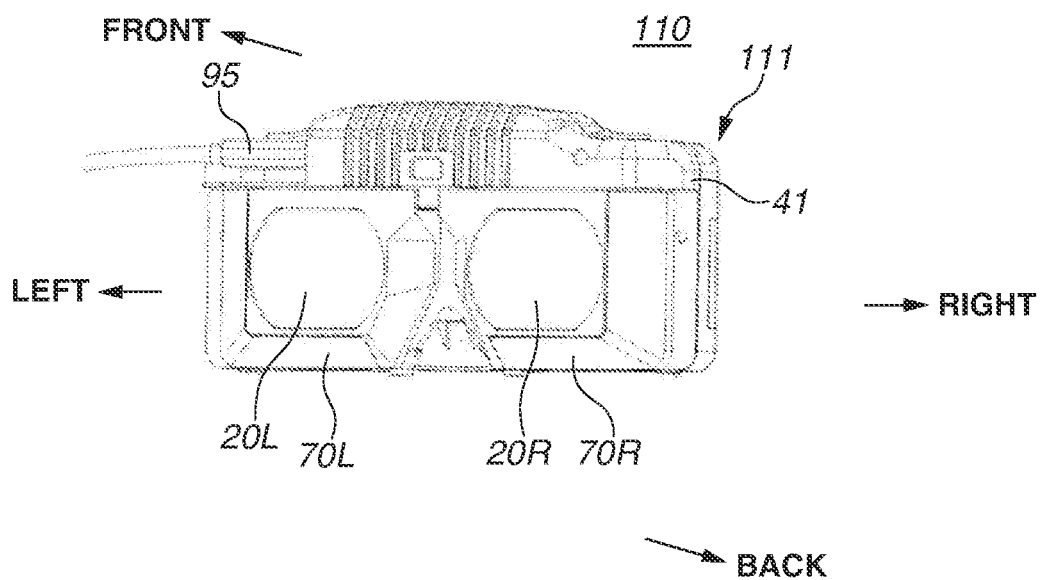
FIG. 8 is a diagram illustrating an image display device according to one or more aspects of the present disclosure as viewed from the back.

FIG. 8 is a diagram illustrating the image display device 110 as viewed from the back. The image display device 110 includes an exterior unit 111 in place of the exterior unit 101 of the first exemplary embodiment.

Figure 9A:
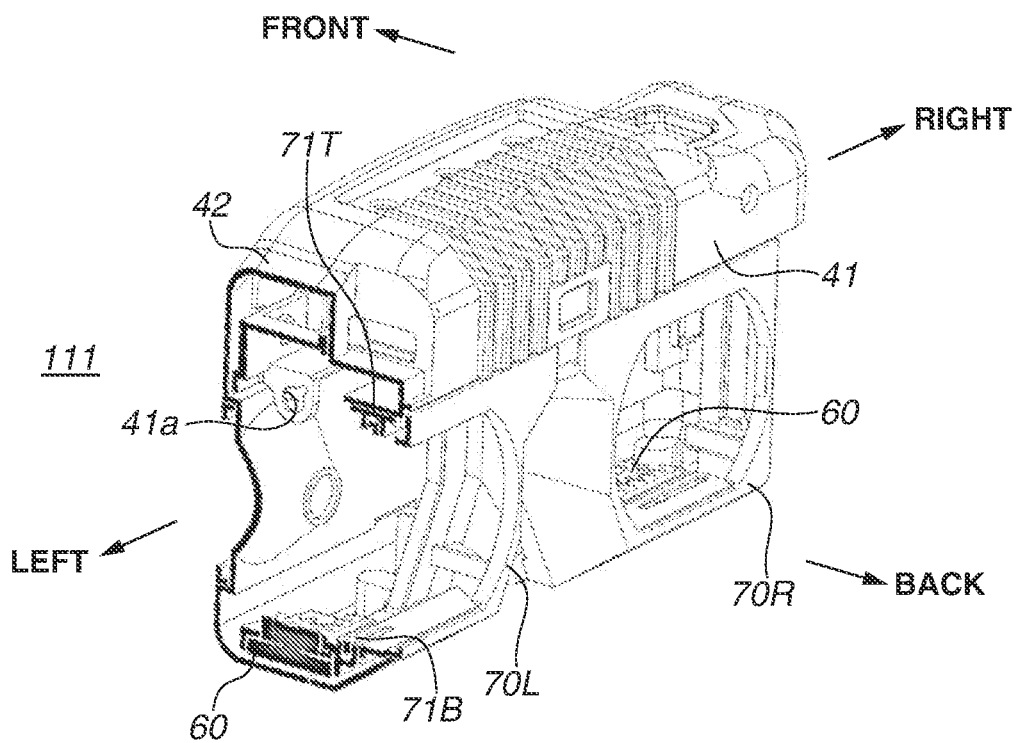
FIGS. 9A and 9B are a cut-away view of an exterior unit and a side view of a part of the exterior unit, respectively.

FIG. 9A is a cut-away view of the exterior unit 111.

The exterior unit 111 includes a rear cover 41, a front cover 42, and lens hoods 70L and 70R.

The rear cover 41 includes tail members 71T and 71B at an upper part and a lower part of a space where the lens hoods 70L and 70R are disposed. The rail members 71T and 71B guide the lens hoods 70L and 70R in a substantially linear direction along the right-left direction relative to the rear cover 41.

Figure 9B:
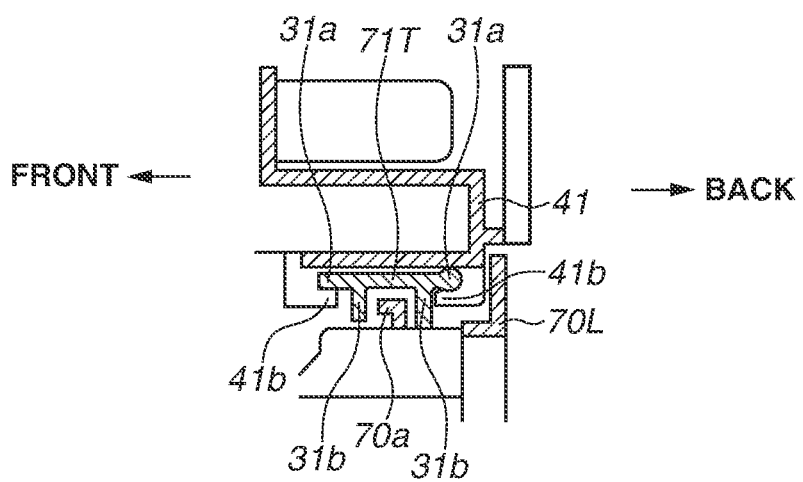

FIG. 9B is a diagram illustrating a configuration around the rail member 71T illustrated in FIG. 9A as viewed from the left. The rail member 71T slides in the right-left direction along the grooves 41b relative to the rear cover 41. Similarly, the rail member 71B slides in the right-left direction relative to the rear cover 41.

The lens hoods 70L and 70R are engaged with the rail members 71T and 71B to move in the right-left direction integrally with the rail members 71T and 71B. Further, the lens hoods 70L and 70R include a regulating portion 70a between a pair of second protrusions 31b of the rail member 71T. The regulating portion 70a of the present exemplary embodiment is disposed with a space in the front-back direction and the up-down direction between the pair of second protrusions 31b, and thus can move within a predetermined distance in the front-back direction and the up-down direction. Therefore, the lens hoods 70L and 70R are engaged with the rail members 71T and 71B only in the right-left direction while being movable in the front-back direction and the up-down direction. Because the rail members 71T and 71B and the lens hoods 70L and 70R are thus engaged with each other, the lens hoods 70L and 70R can also move in the right-left direction and in a direction different from the right-left direction relative to the rear cover 41 via the rail members 71T and 71B.

Lenses 20L and 20R and the lens hoods 70L and 70R are engaged with each other to be movable in conjunction with each other. The lens hoods 70L and 70R of the present exemplary embodiment are engaged with the lenses 20L and 20R in the front-back direction and the up-down direction in addition to the right-left direction. Therefore, as illustrated in FIG. 8, a gap between the lens hoods 70L and 70R and the lenses 20L and 20R can be minimized, so that appearance quality can be improved. However, in such a configuration, if an external force that causes deformation is applied to the lens hoods 70L and 70R, the force may influence the lenses 20L and 20R. In this case, there is provided a stopper structure by which the lens hoods 70L and 70R are brought into contact with the rear cover 41 or the rail members 71T and 71B when an external force that plastically deforms the lenses 20L and 20R is applied to the lens hoods 70L and 70R. Therefore, the stopper structure can suppress the deformation of the lenses 20L and 20R within elastic deformation, so that a change in optical accuracy can be prevented.

In this way, the lens hoods 70L and 70R are positioned with respect to the lenses 20L and 20R, so that the appearance quality can be improved. Moreover, the lens hoods 70L and 70R can also move in the directions other than the right-left direction relative to the rear cover 41, and the optical accuracy can be improved by providing the stopper structure that brings the lens hoods 70L and 70R into contact with the rear cover 41 or the rail members 71T and 71B in a case where an external force that causes deformation is applied.

An image display device 120 according to a third exemplary embodiment will be described. Configurations similar to those of the first exemplary embodiment are provided with the same reference numerals as those thereof and thus will not be described. The image display device 120 includes an exterior unit 121 and an optical unit 122.

FIG. 10 is a diagram illustrating an engagement mechanism between the exterior unit 121 and the optical unit 122.

The exterior unit 121 includes a rear cover 81. The rear cover 81 includes four shaft holes 81a formed in the respective support plates that protrude frontward at upper, lower, right, and left positions while being away from each other in an inner space thereof. The shaft holes 81a function as a part of an engagement mechanism for engagement between the exterior unit 121 and the optical unit 122. The optical unit 122 includes an optical base 90. In the optical base 90, four shaft portions 90c are disposed at upper, lower, right, and left parts of the base portion 50a while being away from each other. The shaft portions 90c function as a part of the engagement mechanism for engagement between the exterior unit 121 and the optical unit 122.

The four shaft portions 90c of the optical base 90 are inserted into the respective four shaft holes 81a of the rear cover 81, so that the optical unit 122 and the exterior unit 121 are engaged with each other. Here, the shaft portions 90c are inserted into the shaft holes 81a with a space therebetween, so that the optical base 90 and the rear cover 81 are engaged with each other in a state with play. Therefore, the optical base 90 can move within a fixed distance relative to the rear cover 81. In the present exemplary embodiment, a flexible member such as a sponge is disposed between each of the shaft portions 90c and shaft holes 81a to stabilize the position of the optical unit 122. Therefore, even if a user applies an external force that causes deformation such as twisting while holding the exterior unit 121, the transmission of the applied force to the optical base 90 can be suppressed by the distance in which the optical base 90 can move relative to the rear cover 81. Suppressing the transmission of the force to the optical base 90 can reduce an influence on lenses 20L and 20R, image capturing cameras 10L and 10R, and positioning cameras 11L and 11R attached to the optical base 90, so that the optical accuracy of the optical unit 122 can be improved.

Various exemplary embodiments of the present disclosure are described above, but the present disclosure is not limited to these exemplary embodiments, and various modifications can be made without departing from the scope of the present disclosure, and the above-described exemplary embodiments can be combined as appropriate.

In the above-described exemplary embodiments, the rear covers 41 and 81 include the shaft holes 41a and 81a, respectively, and the optical bases 50 and 90 include the shaft portions 50c and 90c, respectively, but the exemplary embodiments are not limited thereto. For example, each of the rear covers 41 and 81 or the front cover 42 can include one of the shaft portion and the shaft hole, and the optical bases 50 and 90 can each include the other of the shaft portion and the shaft hole.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-015293, filed Jan. 31, 2020, which is hereby incorporated by reference herein in its entirety.

What is claimed is:

1. An image display device comprising:
   a pair of display optical systems;
   a base to which the pair of display optical systems are attached via a display optical system guide unit which configured to guide the pair of display optical systems to move in a substantially linear direction;
   a main body exterior configured to house the base without covering the pair of display optical systems;
   a pair of display exteriors separated from the main body exterior and each of the pair of display exteriors configured to cover corresponding one of the pair of display optical system; and
   a display exterior guide unit configured to guide the pair of display exteriors in a substantially linear direction relative to the main body exterior,
   wherein each of the pair of the display exteriors and the corresponding one of the pair of the display optical systems are engaged with each other to move together, and
   wherein the base is engaged with the main body exterior in a floating state by an engagement mechanism so as to suppress transmission of an external force applied to the main body exterior to the base.

2. The image display device according to claim 1,
   wherein one of the base and the main body exterior includes a shaft portion,
   wherein the other of the base and the main body exterior includes a shaft hole, and
   wherein the engagement mechanism establishes engagement by insertion of the shaft portion into the shaft hole in a loose-fit state.

3. The image display device according to claim 2, wherein the base includes a rotation stop portion configured to stop the base from rotating around the shaft portion and the shaft hole.

4. The image display device according to claim 1, further comprising a holding mechanism configured to hold the pair of display exteriors at any position relative to the main body exterior.

5. The image display device according to claim 1, wherein at least one of the pair of display exteriors and the main body exterior includes a limiting mechanism configured to limit movement of the pair of display exteriors in a case where the pair of display exteriors moves relative to the main body exterior.

6. The image display device according to claim 1, wherein the base includes at least one of an image capturing unit configured to acquire an image of a surrounding area and an acquisition unit configured to acquire position information.

7. The image display device according to claim 1, wherein the pair of display exteriors moves relative to the main body exterior in a direction different from the substantially linear direction, and is positioned with respect to the pair of display optical systems.

* * * * *